United States Patent
Kang et al.

(10) Patent No.: US 8,649,315 B2
(45) Date of Patent: Feb. 11, 2014

(54) APPARATUS AND METHOD FOR PROCESSING PREAMBLE CHANGE OF RELAY STATION IN BROADBAND WIRELESS ACCESS COMMUNICATION SYSTEM USING MULTIHOP RELAY

(75) Inventors: Hyun-Jeong Kang, Seoul (KR); Young-Bin Chang, Anyang-si (KR); Jung-Je Son, Yongin-si (KR); Taori Rakesh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 515 days.

(21) Appl. No.: 12/471,705

(22) Filed: May 26, 2009

(65) Prior Publication Data

US 2009/0303919 A1 Dec. 10, 2009

(30) Foreign Application Priority Data

Jun. 4, 2008 (KR) .................. 10-2008-0052665
May 21, 2009 (KR) .................. 10-2009-0044248

(51) Int. Cl.
*H04J 3/08* (2006.01)

(52) U.S. Cl.
USPC .......... 370/315; 370/492; 370/501; 455/11.1

(58) Field of Classification Search
None
See application file for complete search history.

(56) References Cited

U.S. PATENT DOCUMENTS

| | | | |
|---|---|---|---|
| 2006/0046643 A1* | 3/2006 | Izumikawa et al. | 455/7 |
| 2007/0087691 A1 | 4/2007 | Lee et al. | |
| 2007/0149118 A1* | 6/2007 | Kang et al. | 455/11.1 |
| 2007/0264933 A1 | 11/2007 | Kang et al. | |
| 2007/0280188 A1 | 12/2007 | Kang et al. | |
| 2008/0165748 A1* | 7/2008 | Visotsky et al. | 370/338 |
| 2009/0207804 A1* | 8/2009 | Chou et al. | 370/331 |
| 2009/0303919 A1* | 12/2009 | Kang et al. | 370/315 |

* cited by examiner

*Primary Examiner* — Yemane Mesfin
*Assistant Examiner* — Khoa Huynh
(74) *Attorney, Agent, or Firm* — Jefferson IP Law, LLP

(57) ABSTRACT

An apparatus and a method for processing a change of a preamble of a Relay Station (RS) are provided. An operating method of a Base Station (BS) includes providing a relay service via an RS, determining whether a preamble of the RS needs to change, when it is necessary to change the preamble of the RS, sending a preamble change command message to the RS and, when the preamble of the RS is changed, sending a preamble change notification message informing of the preamble change to at least one lower node of the RS.

22 Claims, 8 Drawing Sheets

APPARATUS AND METHOD FOR PROCESSING PREAMBLE CHANGE OF RELAY STATION IN BROADBAND WIRELESS ACCESS COMMUNICATION SYSTEM USING MULTIHOP RELAY

PRIORITY

This application claims the benefit under 35 U.S.C. §119 (a) of a Korean patent application filed in the Korean Intellectual Property Office on Jun. 4, 2008 and assigned Serial No. 10-2008-0052665 and a Korean patent application filed in the Korean Intellectual Property Office on May 21, 2009 and assigned Serial No. 10-2009-0044248, the entire disclosure of which is hereby incorporated by reference.

BACKGROUND OF THE INVENTION

1. Field of the Invention

The present invention relates generally to a broadband wireless access communication system using a multihop relay scheme. More particularly, the present invention relates to an apparatus and a method for processing change of a preamble of a Relay Station (RS).

2. Description of the Related Art

A fourth generation (4G) communication system, which is a next-generation communication system, aims to provide services of various Quality of Service (QoS) levels at a data rate of about 100 Mbps. Particularly, 4G communication systems are advancing in order to guarantee mobility and QoS in Broadband Wireless Access (BWA) communication systems such as wireless Local Area Network (LAN) systems and wireless Metropolitan Area Network (MAN) systems. Representative examples include an Institute of Electrical and Electronics Engineers (IEEE) 802.16d communication system and an IEEE 802.16e communication system.

The IEEE 802.16d communication system and the IEEE 802.16e communication system adopt an Orthogonal Frequency Division Multiplexing (OFDM)/Orthogonal Frequency Division Multiple Access (OFDMA) scheme for physical channels. The IEEE 802.16d communication system does not consider mobility of a Subscriber Station (SS) and assumes a single-cell structure. In contrast, the IEEE 802.16e communication system considers the mobility of the terminal. A mobile terminal is referred to herein as a Mobile Station (MS).

FIG. 1 illustrates a conventional IEEE 802.16e communication system.

The IEEE 802.16e communication system has a multi-cell structure. That is, the IEEE 802.16e communication system covers a cell 100 and a cell 150. The IEEE 802.16e communication system includes a Base Station (BS) 110 which manages the cell 100, a BS 140 which manages the cell 150, and MSs 111, 113, 130, 151, and 153. Between the BSs 110 and 140 and the MSs 111, 113, 130, 151 and 153, signals are transmitted and received according to the OFDM/OFDMA scheme. Of the MSs 111, 113, 130, 151 and 153, the MS 130 moves in a boundary between the cell 100 and the cell 150. That is, the MS 130 moves within a handover area. When the MS 130 moves into the cell 150 managed by the BS 140 while transmitting and receiving signals with the BS 110, its serving BS is changed from the BS 110 to the BS 140.

Since the signaling is performed between the fixed BS and the MS over the direct link as shown in FIG. 1, the IEEE 802.16e communication system may establish a radio communication link of high reliability between the BS and the MS. However, because of the fixed BS, there is a low flexibility in the wireless network configuration for the IEEE 802.16e communication system. Thus, in a radio environment under severe changes of traffic distribution or traffic requirement, the IEEE 802.16e communication system hardly provides for an efficient communication service.

To address these shortcomings, using a stationary or mobile Relay Station (RS) or the conventional MSs, multihop relay data transmission may be applied to a conventional wireless cellular communication system such as IEEE 802.16e communication system. The wireless multihop relay communication system may reconfigure the network by promptly handling the communication environment change and operate the entire radio network more efficiently. For example, the wireless multihop relay communication system may extend the cell service coverage area and increase the system capacity. If a channel between the BS and the MS is in poor condition, the wireless multihop relay communication system may provide the MS with a channel having a better condition by installing the RS between the BS and the MS and establishing a multihop relay path via the RS. Also, in a cell boundary having a poor communication condition from the BS, the multihop relay scheme may offer a high-speed data channel and extend the cell service coverage area.

FIG. 2 illustrates a conventional multihop relay broadband wireless communication system for service coverage area expansion of the BS.

The wireless multihop relay communication system of FIG. 2 has a multi-cell structure. That is, the wireless multihop relay communication system covers a cell 200 and a cell 240. The wireless multihop relay communication system includes a BS 210 which manages the cell 200, a BS 250 which manages the cell 240, MSs 211 and 213 in the cell 200, MSs 221 and 223 managed by the BS 210 in a coverage 230 outside the cell 200, an RS 220 which provides multihop relay paths between the BS 210 and the MSs 221 and 223 in the coverage 230, MSs 251, 253 and 255 in the cell 240, MSs 261 and 263 managed by the BS 250 in a coverage 270 outside the cell 240, and an RS 260 which provides multihop relay paths between the BS 250 and the MS 261 and 263 in the coverage 270. Between the BSs 210 and 250, the RSs 220 and 260, and the MSs 211, 213, 221, 223, 251, 253, 255, 261 and 263, signals are transmitted and received using the OFDM/OFDMA scheme.

FIG. 3 illustrates a conventional multihop relay broadband wireless communication system for increasing system capacity.

The wireless multihop relay communication system of FIG. 3 includes a BS 310, MSs 311, 313, 321, 323, 331 and 333, and RSs 320 and 330 which provide multihop relay paths between the BS 310 and the MSs 311, 313, 321, 323, 331 and 333. Between the BS 310, the RSs 320 and 330, and the MSs 311, 313, 321, 323, 331 and 333, signals are transmitted and received using the OFDM/OFDMA scheme. The BS 310 manages a cell 300. The MSs 311, 313, 321, 323, 331 and 333 and the RSs 320 and 333 within the coverage of the cell 300 may transmit and receive signals directly to and from the BS 310.

However, some MSs 321, 323, 331 and 333 near the boundary of the cell 300 are subject to a low Signal to Noise Ratio (SNR) of direct links between the BS 310 and the MSs 321, 323, 331 and 333. The RSs 320 and 330 can raise the effective transfer rate of the MSs and increase the system capacity by providing high-speed data transmission paths to the MSs 321, 323, 331 and 333.

In the multihop relay broadband wireless communication system of FIG. 2 or FIG. 3, the RSs 220, 260, 320 and 330 may be infrastructure RSs installed by a service provider and managed by the BSs 210, 250 and 310 which are aware of the existence of the RSs in advance, or client RSs which serve as SSs (or MSs) or RSs in some cases. The RSs 220, 260, 320, 330 may be fixed, nomadic, or mobile like the MS.

As described above, the RS which relays the communication of the MS and the BS may be mobile. A mobile RS may get out of the service coverage area of the BS or its upper RS. When the mobile RS moves into the service coverage area of a new upper RS or the neighboring BS, the MS or the lower RS linked to the mobile RS may perform handover together with the mobile RS.

Meanwhile, when the mobile RS enters the service coverage area of a new target node (RS or neighbor BS), a preamble used by the mobile RS may interfere with the service coverage area of the other neighbor BS or the other RS. In this case, the preamble of the mobile RS needs to be changed. When the preamble of the mobile RS is changed, the MS moving in the service coverage area of the mobile RS recognizes the mobile RS as a new node. Accordingly, the serving BS of the MS hands the MS over to the mobile RS which sends the changed preamble.

The serving BS sends a handover indication message, including a changed preamble index of the mobile RS, to the lower MSs of the mobile RS. For example, the handover indication message can be a MOB_BSHO-REQ message with a forced handover indicator set to '1'. The MSs receiving the handover indication message determine to hand over to the target node (the mobile RS) of the preamble index and conduct a network re-entry procedure to the target node. Herein, the network re-entry procedure includes a code based ranging (RNG-REQ/RSP), a basic capability negotiation (SBC-REQ/RSP), authentication (PKM-REQ/RSP), registration (REG-REQ/RSP), and so on.

As described above, when the preamble of the mobile RS is changed, the MS moving in the service coverage area of the mobile RS is forcibly handed over with the changed preamble. Thus, the node of the changed preamble may continue servicing the MS. However, when the MS not moving outside the service coverage area of the mobile RS unnecessarily conducts the handover (including the network re-entry procedure), unnecessary overhead is created. Thus, there is a need for a method for reducing the overhead when the preamble of the mobile RS is changed.

SUMMARY OF THE INVENTION

An aspect of the present invention is to address at least the above mentioned problems and/or disadvantages and to provide at least the advantages described below. Accordingly, an aspect of the present invention is to provide an apparatus and a method for processing a preamble change of a relay station in a wireless multihop relay communication system.

Another aspect of the present invention is to provide an apparatus and a method for a lower node of a relay station to recognize a preamble change of the relay station in a wireless multihop relay communication system.

Yet another aspect of the present invention is to provide an apparatus and a method for informing a lower node, in a service coverage area of a relay station, of a preamble change of the RS in a wireless multihop relay communication system.

Still another aspect of the present invention is to provide an apparatus and a method for a lower node to sustain a link to a relay station without handover when a preamble of the relay station is changed in a wireless multihop relay communication system.

According to an aspect of the present invention, an operating method of a Base Station (BS) in a wireless multihop relay communication system is provided. The method includes providing a relay service via a Relay Station (RS), determining whether a preamble of the RS needs to change, when it is necessary to change the preamble of the RS, sending a preamble change command message, to the RS and, when the preamble of the RS is changed, sending a preamble change notification message informing of the preamble change, to at least one lower node of the RS.

According to another aspect of the present invention, an operating method of a Mobile Station (MS) in a wireless multihop relay communication system is provided. The method includes communicating with a BS through an RS, in the process of the communication via the RS, determining whether a preamble change notification message is received from an upper node, when receiving the preamble change notification message, obtaining new preamble information of the RS from the received message and receiving a new preamble signal of the RS according to the obtained information.

According to yet another aspect of the present invention, an operating method of an RS in a wireless multihop relay communication system is provided. The method includes providing a relay service, determining whether a preamble change command message is received from a BS during the relay service, when receiving the preamble change command message, obtaining new preamble information from the received message, changing a preamble signal according to the new preamble information and transmitting the changed preamble signal.

According to still another aspect of the present invention, an apparatus of a BS in a wireless multihop relay communication system is provided. The apparatus includes a controller for determining whether a preamble of an RS needs to change, a generator for, when it is necessary to change the preamble of the RS, generating at least one of a preamble change command message and a preamble change notification message and a transmitter for sending the preamble change command to the RS by processing the preamble change command message in a physical layer if the preamble change command message is generated, and for sending the preamble change notification message to a lower node of the RS by processing the preamble change notification message in the physical layer if the preamble change notification message is generated.

According to a further aspect of the present invention, an apparatus of an MS in a wireless multihop relay communication system is provided. The apparatus includes an analyzer for, when receiving a preamble change notification message from an upper node while communicating via an RS, obtaining new preamble information of the RS from the received message, a controller for changing a preamble of the RS according to the new preamble information and a preamble demodulator for receiving a new preamble signal from the RS under control of the controller.

According to a further aspect of the present invention, an apparatus of an RS in a wireless multihop relay communication system is provided. The apparatus includes a message analyzer for, when receiving a preamble change command message from a BS while providing a relay service, obtaining new preamble information from the received message, a controller for changing a preamble signal according to the new preamble information and a preamble signal generator for generating the changed preamble signal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

Figure 1:
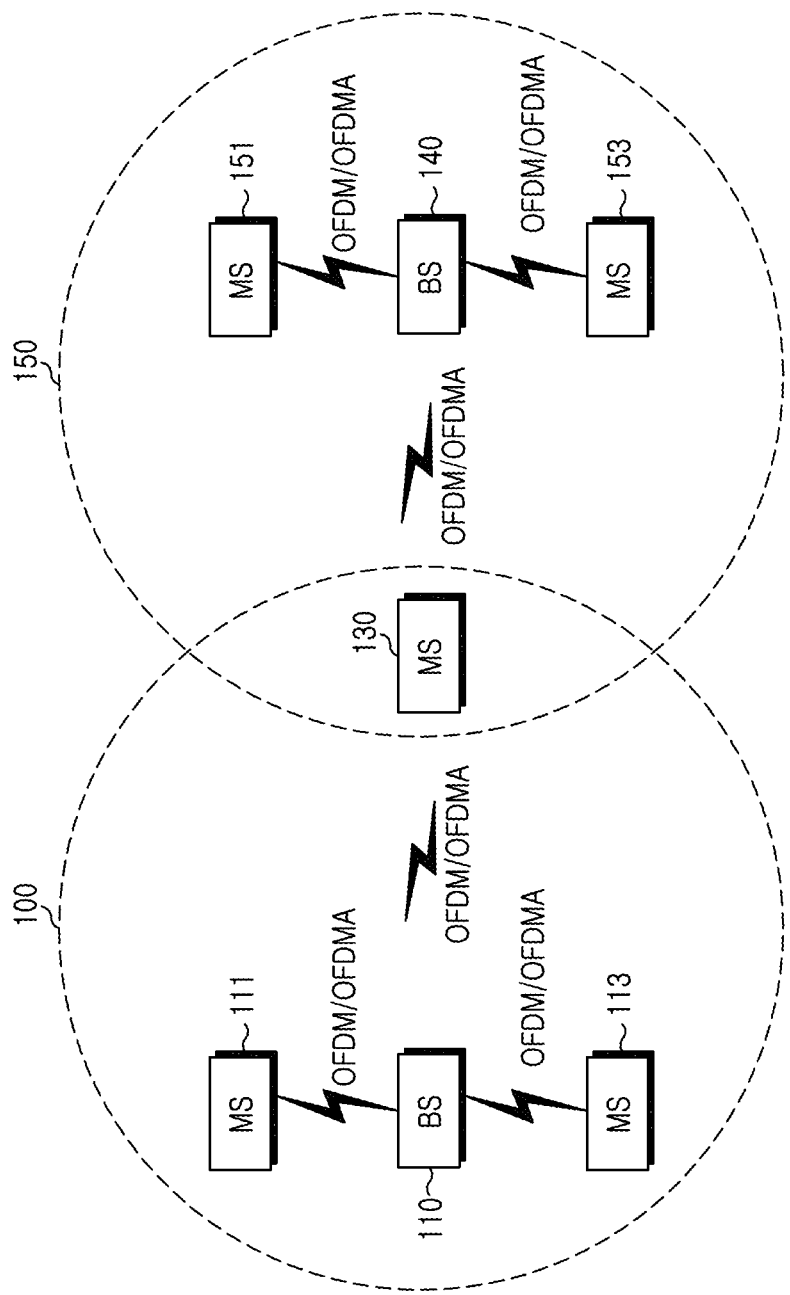
FIG. 1 illustrates a conventional IEEE 802.16e communication system.
Figure 2:
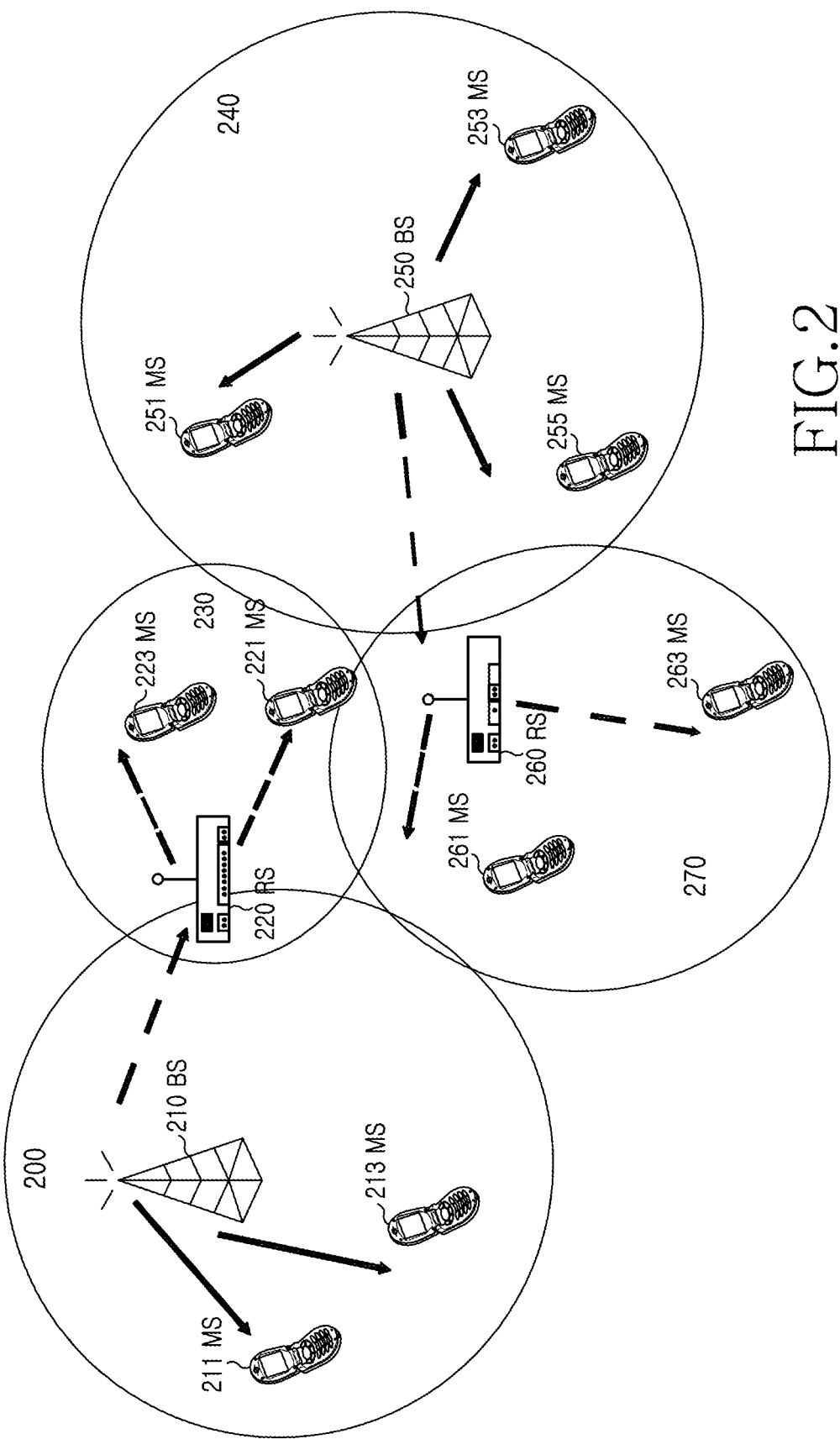
FIG. 2 illustrates a conventional multihop relay broadband wireless communication system for a service coverage area extension of a BS.
Figure 3:
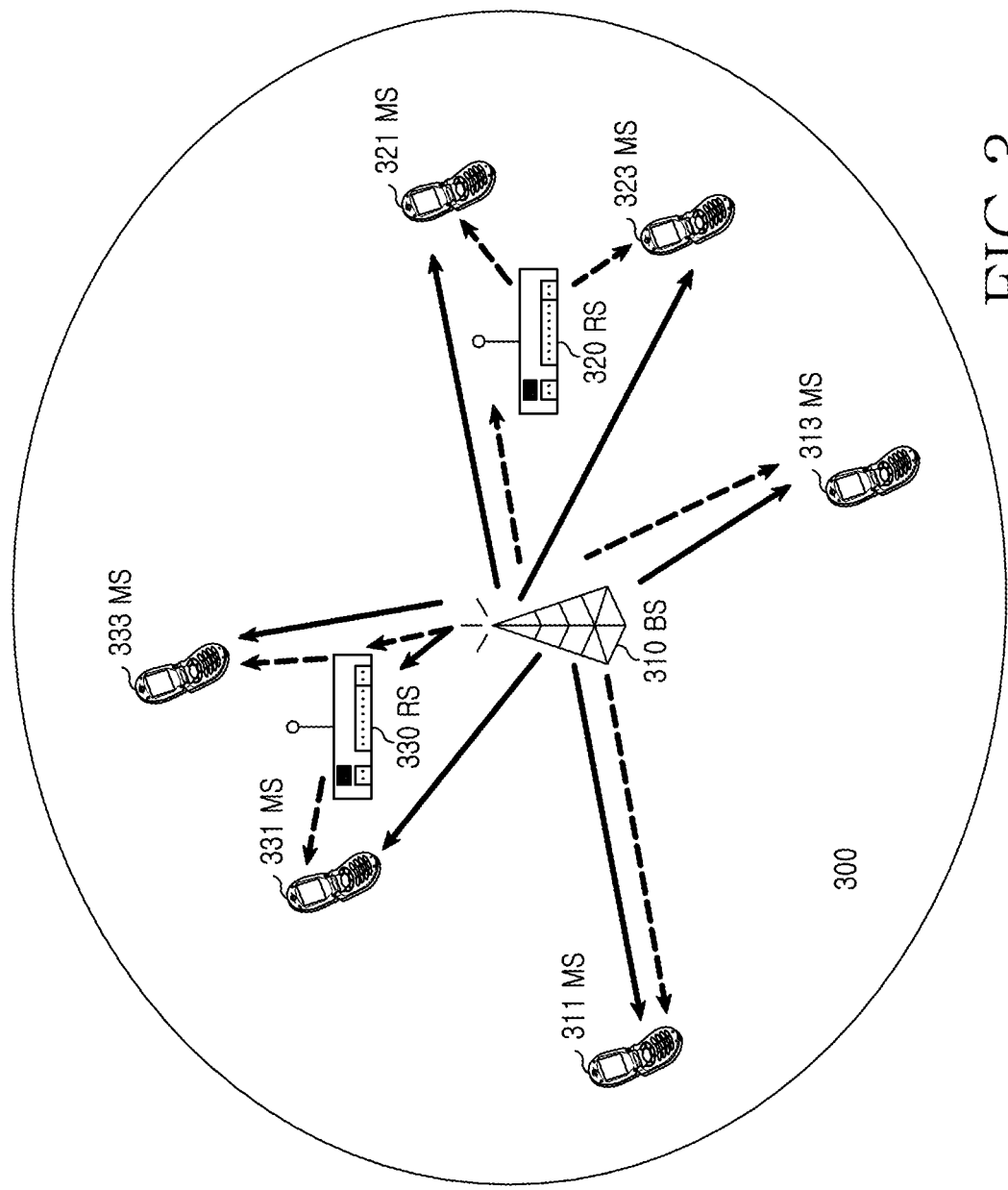
FIG. 3 illustrates a conventional multihop relay broadband wireless communication system for increasing system capacity.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide an apparatus and method for processing a preamble change of a Relay Station (RS) in a broadband wireless multihop relay communication system.

For example, when a mobile RS is out of range of the service coverage area of a Base Station (BS) or its upper RS and enters the service coverage area of a new upper RS or a neighboring BS, a preamble of the mobile RS may be changed. When the mobile RS moves to the new service coverage area and the preamble of the mobile RS collides with that of an existing node in the new service coverage area, the preamble of the mobile RS may be changed. Alternatively, the preamble of the existing node may be modified. When the BS or the RS newly plugs in, the preamble of the existing node may be changed or a preamble of a specific node may be changed during the operation according to the change of a provider policy. The preamble of the RS (the mobile or fixed RS) may be changed in such various situations. When the preamble of the RS is modified, exemplary embodiments of the present invention provide a method for the lower node to maintain the link to the RS without handover.

Hereinafter, a broadband wireless multihop relay communication system, for example, an Orthogonal Frequency Division Multiplexing (OFDM)/Orthogonal Frequency Division Multiple Access (OFDMA) communication system may realize a high-speed data transfer by transmitting physical channel signals using a plurality of subcarriers and support the mobility of the MS by using a multi-cell structure.

While a broadband wireless access communication system is illustrated by way of example, the present invention is applicable to any other cellular communication systems using a multihop relay scheme.

Figure 4:
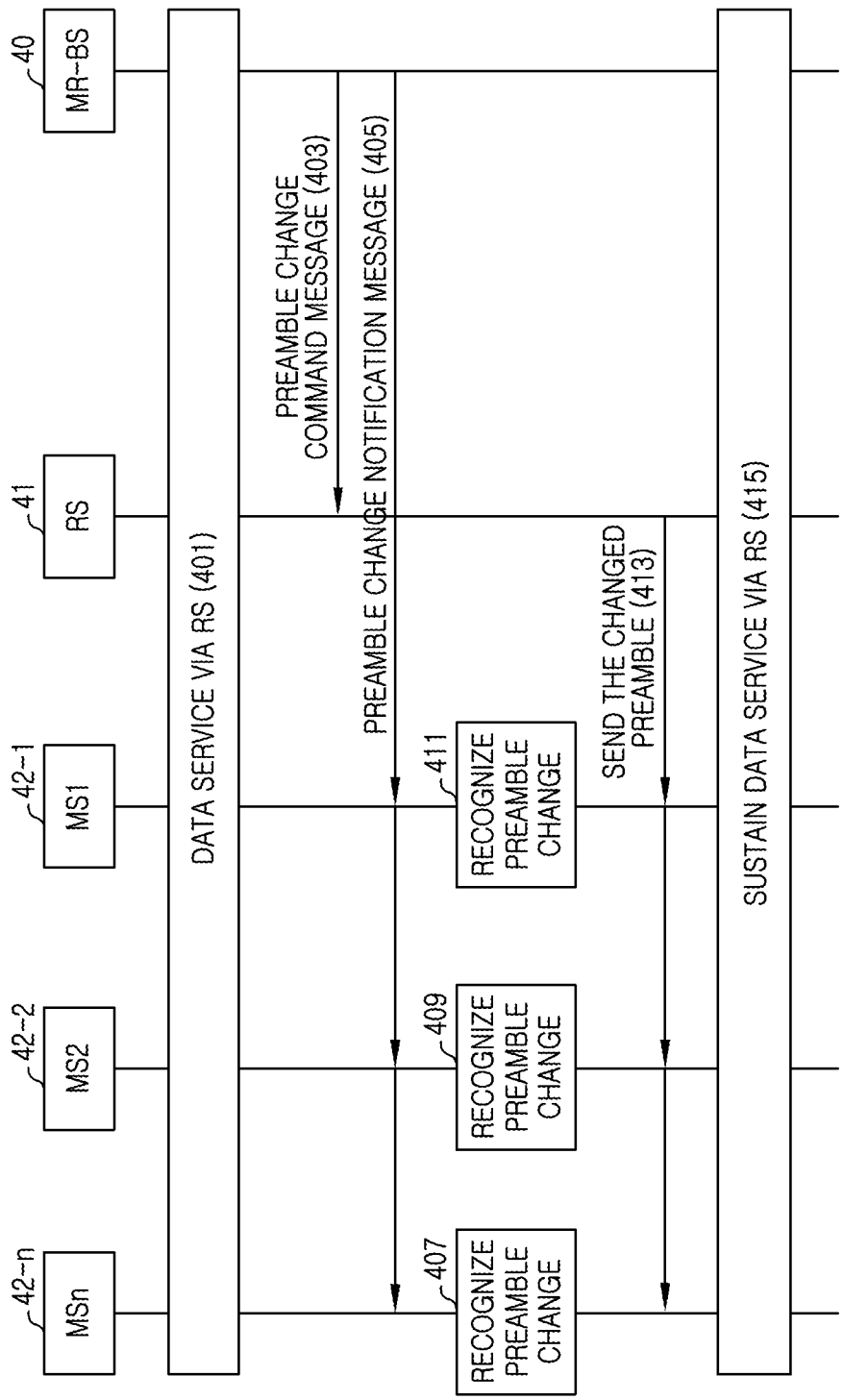
FIG. 4 illustrates signal exchanges for processing a preamble change of an RS in a wireless multihop relay communication system according to an exemplary embodiment of the present invention.

FIG. 4 illustrates signal exchanges for processing a preamble change of an RS in a wireless multi-hop relay communication system according to an exemplary embodiment of the present invention.

In step 401, a BS 40 transmits and receives data to and from an MS1 42-1 to an MSn 42-n (i.e. MS1 42-1, MS2 42-2 . . . MSn 42-n) using a relay service of a mobile RS 41. During the relay service, the BS 40 determines whether it is necessary to change the preamble of the mobile RS 41. When the preamble of the mobile RS 41 needs to change, the BS 40 sends a preamble change command message to the mobile RS 41 in step 403. Herein, the BS 40 may be a serving BS which manages a serving cell of the mobile RS 41, or a target BS which manages a neighboring cell. The preamble change command message may include information illustrated in Table 1.

TABLE 1

| Preamble change command( ){ | |
|---|---|
| New preamble index | Newly assigned preamble index for the mobile RS |
| Action time | the time (frame number) when the mobile RS transmits the new preamble |
| } | |

As shown in Table 1, the preamble change command message may include index information of a new preamble allocated to the mobile RS 41 and action time information for sending the new preamble. When the mobile RS 41 performs handover to the target BS, the preamble of the mobile RS 41 may be changed. In such a case, the BS 40 may send index information of the new preamble using any handover control message instead of the preamble change command message.

In step 405, the BS 40 sends a preamble change notification message, informing of the new preamble information of the mobile RS 41, to the MS1 42-1 to the MSn 42-n (i.e. MS1 42-1, MS2 42-2 . . . MSn 42-n) moving in the service coverage area of the mobile RS 41. The preamble change notification message may include information of Table 2.

TABLE 2

| Preamble change notification( ){ | |
|---|---|
| New preamble index | New preamble index of the mobile RS |
| Action time | the time when the new preamble is transmitted |
| } | |

As shown in Table 2, the preamble change notification message may include index information of the new preamble of the mobile RS 41, and action time information for transmitting the new preamble of the mobile RS 41.

The preamble change notification message may be transmitted from the BS 40 as illustrated in FIG. 4. Alternatively, the mobile RS 41 receiving the preamble change command message from the BS 40 may send the preamble change notification message to the MS1 42-1 to the MSn 42-*n* (i.e. MS1 42-1, MS2 42-2 . . . MSn 42-*n*).

Each of the MSs 42-1 to 42-*n* analyzes the preamble change notification message received from the BS 40 and recognizes that the preamble of the mobile RS 41 will be changed after a certain time in steps 407, 409 and 411.

In step 413, the mobile RS 41 determines whether the action time as set in the preamble change command message occurs and sends the changed preamble when the action time occurs. Each of the MSs 42-1 to 42-*n* determines whether the action time as set in the preamble change notification message occurs and receives the changed preamble of the mobile RS 41 at the action time in step 413.

In step 415, the BS 40 sustains the data service to the MSs 42-1 to 42-*n* (i.e. MS1 42-1, MS2 42-2 . . . MSn 42-*n*) using the relay service of the mobile RS 41 which sends the changed preamble.

When the BS 40 is the target BS managing the neighboring cell, that is, when the mobile RS 41 performs handover to the target BS, Connection IDentifiers (CIDs) of the MS1 42-1 to the MSn 42-*n* (i.e. MS1 42-1, MS2 42-2 . . . MSn 42-*n*) receiving the relay service of the mobile RS 41 may be changed. When the CIDs are to be changed, the mobile RS 41 may exchange the previous CIDs with new CIDs, rather than sending new ID information to the MSs 42-1 through 42-*n*.

For example, when receiving a packet including the previous CID from the MS 42, the mobile RS 41 exchanges the previous CID of the packet with a new CID and then sends it to the BS 40. When receiving a packet including the new CID from the BS 40, the mobile RS 41 exchanges the new CID of the packet with the previous CID and then sends the packet to the MS 42.

Alternatively, when there is a tunnel connection between the BS and the mobile RS, a tunnel CID of the mobile RS allocated by the BS may be changed, rather than changing the CID of the MS. That is, when the mobile RS 41 enters the target cell managed by the target BS 40, the target BS 40 may allocate to the mobile RS 41 a new tunnel CID mapped to the previous tunnel CID, without having to change the CIDs of the MSs relayed by the mobile RS 41. If each of BS allocates station identifiers (STID) for the MSs, the STID of the corresponding MS under the mobile RS 41, may be changed during handover. When the STID of the corresponding MS is changed, the BS 40 may send a preamble change notification message, informing of the changed STID of the corresponding MS. That is, the changed STID may be included in the preamble change notification message of Table 2. Also, when service flow mapped to a flow identifier (FID) of the corresponding MS may be changed, the BS 40 may send a preamble change notification message, informing of the changed FID of the corresponding MS. That is, the changed FID may be included in the preamble change notification message of Table 2.

Figure 5:
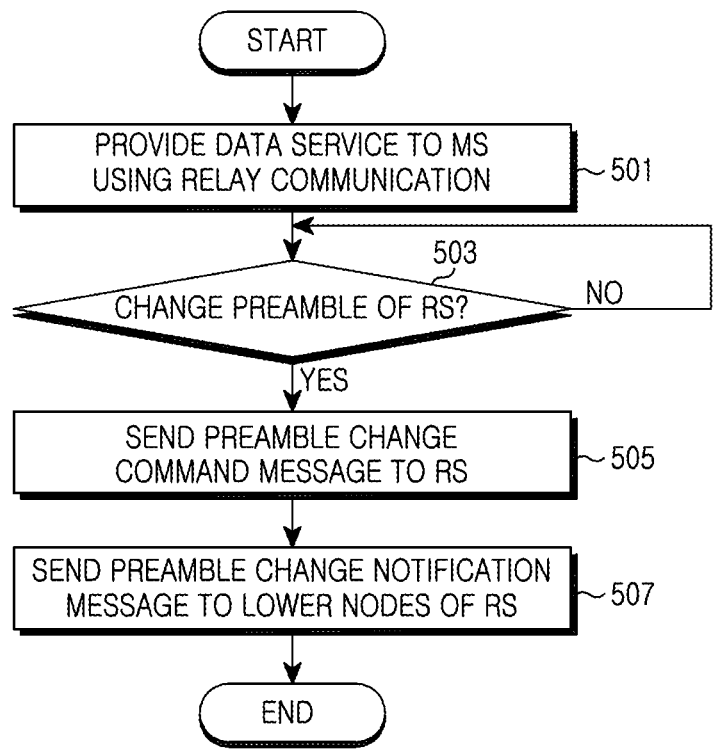
FIG. 5 illustrates operations of a BS in a wireless multihop relay communication system according to an exemplary embodiment of the present invention.

FIG. 5 illustrates operations of a BS in a wireless multihop relay communication system according to an exemplary embodiment of the present invention.

In step 501, the BS provides a data service to the MS using relay communication. In the process of providing the data service to the MS via the RS, the BS determines whether it is necessary to change the preamble sent by the RS in step 503. If the preamble of the mobile RS moving from another cell collides with the preamble of another RS, the BS may change the preamble of the mobile RS. While the collision of the preamble may be detected by the BS or the mobile RS, it is assumed here that the BS determines whether to change the preamble.

When the preamble of the RS needs to change, the BS generates and sends the preamble change command message to the RS in step 505. Herein, the preamble change command message can include the new preamble index information and the action time (e.g., frame number) information of the new preamble application.

In step 507, the BS generates the preamble change notification message informing of the preamble change of the RS and sends the preamble change notification message to the lower nodes of the RS. The preamble change notification message may include the new preamble index information of the RS and the action time information of the new preamble application.

Figure 6:
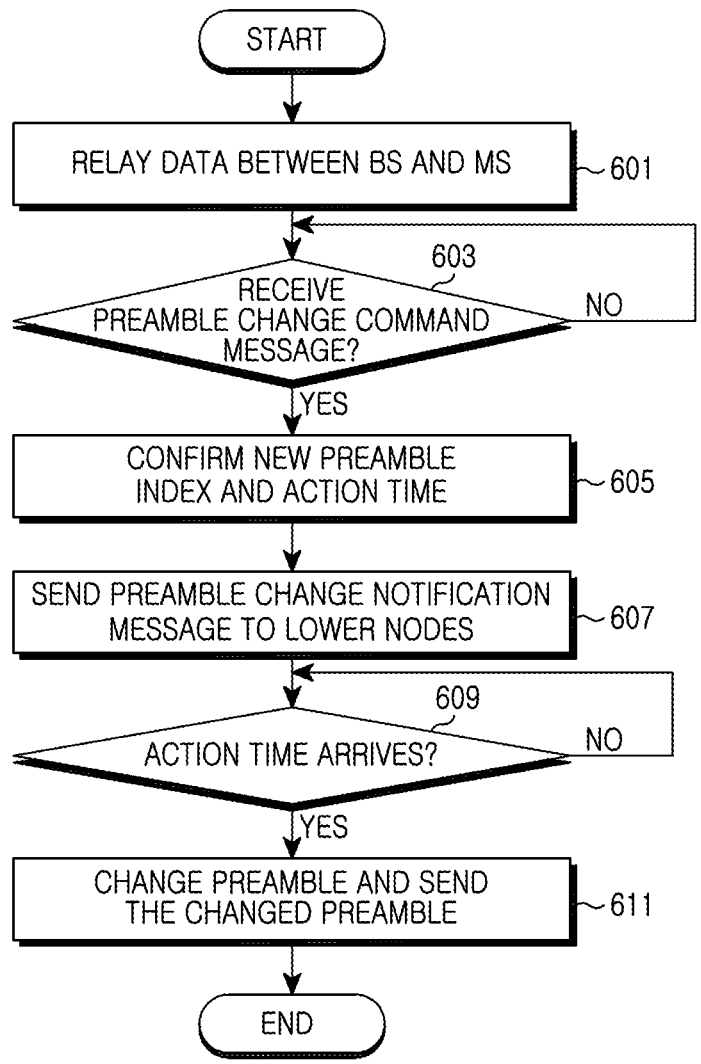
FIG. 6 illustrates operations of an RS in a wireless multihop relay communication system according to an exemplary embodiment of the present invention.

FIG. 6 illustrates operations of an RS in a wireless multihop relay communication system according to an exemplary embodiment of the present invention.

In step 601, the RS relays data between the BS and the MS. During the relay service, the RS determines whether the preamble change command message is received from the BS in step 603. If the preamble change command message is received, the RS confirms the new preamble index information and action time information of the new preamble application from the received message in step 605.

To inform the lower nodes of the preamble change, the RS generates and sends the preamble change notification message to its lower nodes in step 607. The preamble change notification message may include the new preamble index information of the RS and the action time information of the new preamble application.

In step 609, the RS determines whether the action time to apply the new preamble occurs. When the action time occurs, the RS changes the preamble according to the preamble index information as set in the preamble change command message and transmits the changed preamble signal in step 611.

Figure 7:
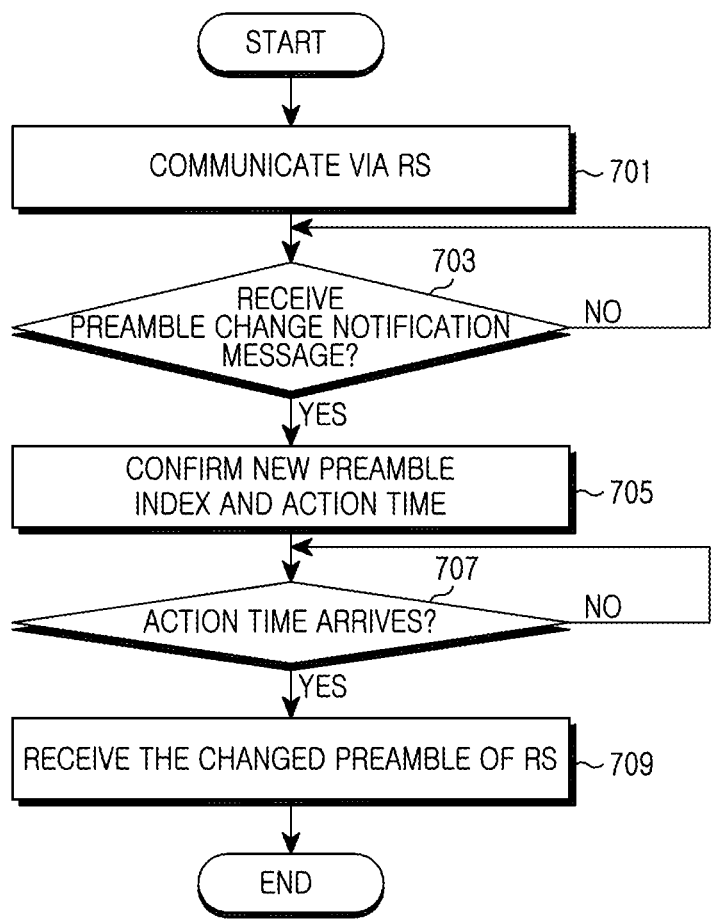
FIG. 7 illustrates operations of an MS in a wireless multihop relay communication system according to an exemplary embodiment of the present invention.

FIG. 7 illustrates operations of an MS in a wireless multihop relay communication system according to an exemplary embodiment of the present invention.

In step 701, the MS communicates with the BS via the RS. In the communication via the RS, the MS determines whether the preamble change notification message informing of the preamble change of the RS is received in step 703. If the preamble change notification message is received, the MS confirms the new preamble index information and the action time information of the new preamble application from the received message in step 705.

In step 707, the MS determines whether the action time to apply the new preamble occurs. When the action time occurs, the MS changes its receiving preamble of the RS according to the preamble index information as set in the preamble change notification message and receives the changed preamble of the RS in step 709.

Figure 8:
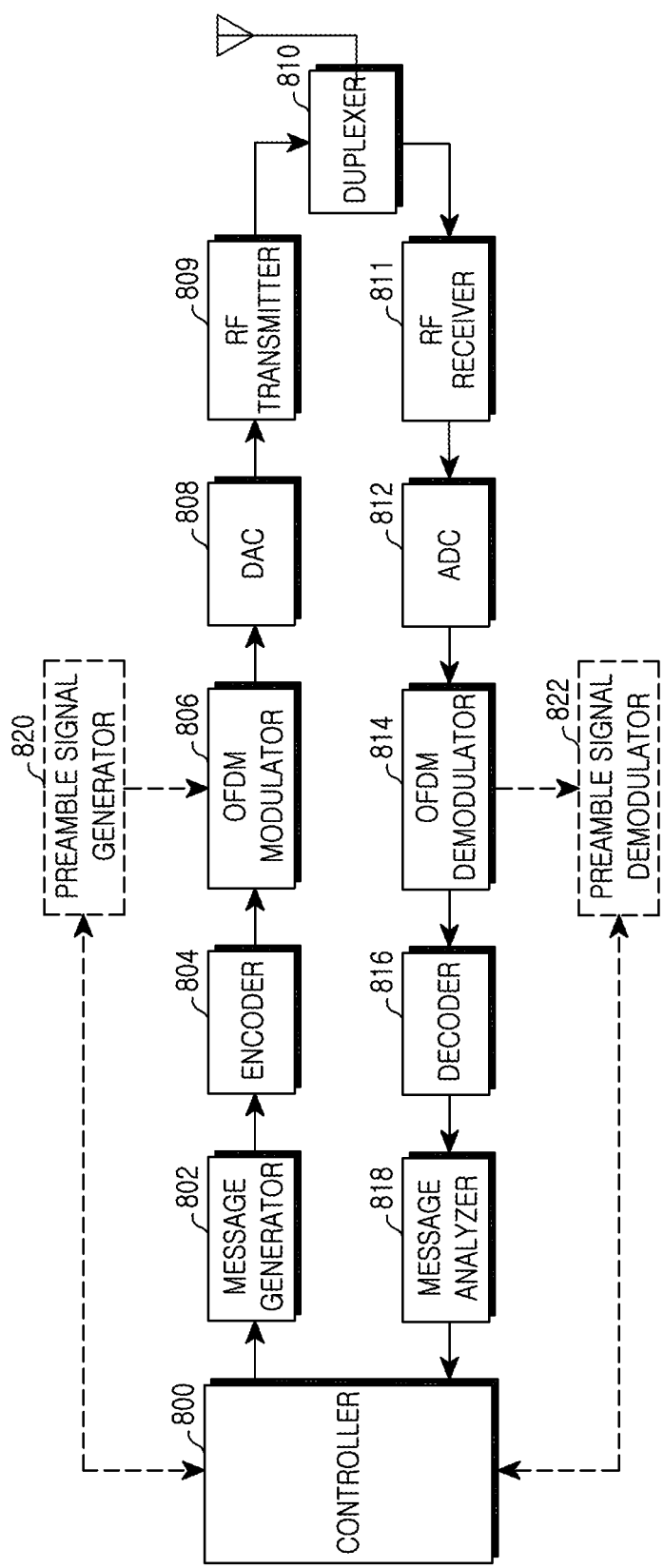
FIG. 8 illustrates a structure of a BS (or an RS or an MS) according to an exemplary embodiment of the present invention.

FIG. 8 illustrates a block diagram of a BS (or an RS or an MS) according to an exemplary embodiment of the present invention. Since the BS, the RS, and the MS including the same interface module (communication module) have substantially the same block structure, the operations of the BS, the RS, and the MS shall be described by referring to FIG. 8. The following explanation assumes a Time Division Duplex (TDD)-OFDMA system. Of course, the present invention is applicable to Frequency Division Duplex (FDD)-OFDMA systems, hybrid systems combining the TDD and the FDD, and other cellular systems adopting various resource division schemes.

The BS (or the RS or the MS) of FIG. 8 includes a controller 800, a message generator 802, an encoder 804, an OFDM modulator 806, a Digital-to-Analog Converter (DAC) 808, a Radio Frequency (RF) transmitter 809, a duplexer 810, an RF receiver 811, an Analog-to-Digital Converter (ADC) 812, an OFDM demodulator 814, a decoder 816, and a message analyzer 818. The BS may further include a preamble signal generator 820, the RS may further include a preamble signal generator 820 and a preamble signal demodulator 822, and the MS may further include a preamble signal demodulator 822.

The controller 800 controls operations of the corresponding node (the BS, the RS, or the MS). The message generator 802 generates a control message (a signaling message or a Media Access Control (MAC) management message) under the control of the controller 800 and outputs the generated control message to the encoder 804 of the physical layer.

The encoder 804 codes and modulates the data output from the message generator 802 using a modulation level (Modulation and Coding Scheme (MCS) level). The OFDM modulator 806 outputs sample data (OFDM symbols) by Inverse Fast Fourier Transform (IFFT)-processing the data output from the encoder 804. The DAC 808 converts the sample data to an analog signal. The RF transmitter 809 converts the analog signal output from the DAC 808 to an RF signal and outputs the RF signal to the duplexer 810.

The duplexer 810 sends the transmit signal output from the RF transmitter 809 over an antenna and forwards a signal received over the antenna to the RF receiver 811 according to the duplexing. For example, according to the TDD scheme, the duplexer 810 transmits the signal output from the RF transmitter 809 over the antenna in the transmission interval, and forwards the signal received via the antenna to the RF receiver 811 in the reception interval.

The RF receiver 811 converts the RF signal received over the antenna to a baseband analog signal. The ADC 812 converts the analog signal output from the RF receiver 811 to sample data. The OFDM demodulator 814 converts the sample data output from the ADC 812 to frequency-domain data through FFT and selects subcarrier data to actually receive from the frequency-domain data.

The decoder 816 demodulates and decodes the data output from the OFDM demodulator 814 at the modulation level (MCS level). The message analyzer 818 analyzes the control message output from the decoder 816 and provides the analysis result to the controller 800.

As constructed above, the controller 800, which may include a protocol controller, controls the message processor 802 and the message generator 818. Namely, the controller 800 may function as the message processor 802 and the message generator 818. Herein, they are separately provided to distinguish their functions. However, in an actual implementation, the controller 800 may process all or part of the message processor 802 and the message generator 818. The controller 800 receives information necessary in the protocol processing from the corresponding component of the physical layer, or issues a control signal to the corresponding component of the physical layer.

Now, based on the construction of FIG. 8, the operations of the BS, the RS, and the MS are explained individually. Hereafter, the signaling processing in the MAC layer shall be mainly described.

First, exemplary operations of the BS are provided.

While offering the data service to the MS via the RS, the controller 800 determines whether the preamble of the RS needs to change. When it is necessary to change the preamble of the RS, the controller 800 directs the message generator 802 to generate the preamble change command message. The message generator 802 generates and forwards the preamble change command message to the physical layer. The message applied to the physical layer is processed in the physical layer and then transmitted to the RS. The preamble change command message may include the new preamble index information and the action time information of the new preamble application.

When it is necessary to change the preamble of the RS, the controller 800 directs the message generator 802 to generate the preamble change notification message. The message generator 802 generates and forwards the preamble change notification message to the physical layer. The preamble change notification message may include the new preamble index information and the action time information of the new preamble application. The preamble change notification message is transmitted to the lower nodes of the RS.

Next, exemplary operations of the RS are provided.

As relaying the data between the BS and the MS, the message analyzer 818 determines whether the preamble change command message is received from the BS by analyzing the received message. If the preamble change command message is received, the message analyzer 818 extracts the new preamble index information and the action time information of the new preamble application from the received preamble change command message, and provides the extracted information to the controller 800.

The controller 800 confirms the index and the action time of the new preamble, and directs the preamble signal generator 820 to change the preamble when the action time arrives. The preamble signal generator 820 generates and provides the preamble signal (or the preamble sequence) according to the index, to the OFDM modulator 806 under the control of the controller 800. The OFDM modulator 806 OFDM-modulates the signal output from the preamble signal generator 802 by mapping the signal to the corresponding subcarrier. The OFDM-modulated preamble signal is transmitted for the synchronization of the lower node.

Now, exemplary operations of the MS are provided.

As communicating with the BS via the RS, the message analyzer 818 determines whether the preamble change notification message informing of the preamble change of the RS is received by analyzing the received message. Receiving the preamble change notification message, the message analyzer 818 extracts the new preamble index information and the action time information of the new preamble application from the received preamble change notification message, and provides the extracted information to the controller 800.

The controller 800 confirms the index and the action time of the new preamble of the RS, and directs the preamble signal demodulator 822 to change the preamble when the action time arrives. The preamble signal demodulator 822 changes the preamble to receive under the control of the controller 800, and demodulates the preamble channel signal output from the OFDM demodulator 814 according to the changed preamble. The demodulated preamble signal can be used to acquire the synchronization (time and frequency synchronization).

As set forth above, when the preamble of the RS is changed in a wireless multihop relay communication system, the lower node can sustain the connection to the mobile RS without handover. Thus, seamless service can be offered to the lower node of the mobile RS and the overhead can be reduced by omitting the handover.

As stated above, the BS generates a preamble change notification message, informing of the changed preamble of the mobile RS of the lower terminal or lower RS of the mobile RS and sends it to the lower terminal or lower RS of the mobile RS using relay transmission of the mobile RS.

However, if the mobile RS may directly compose the message that is transmitted to the lower terminal or lower RS of the mobile RS, the mobile RS may generate and transmit the preamble change notification message to the lower terminal or lower RS. Then the mobile RS may compose the preamble change notification message based on control information included in the preamble change command message that is received from the BS.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of a Base Station (BS) in a wireless multihop relay communication system, the method comprising:
   providing a relay service through a Relay Station (RS);
   determining whether a preamble of the RS needs to change;
   sending a preamble change command message from the BS to the RS when it is necessary to change the preamble of the RS; and
   sending a preamble change notification message from the BS, informing of the preamble change and comprising an index of new preamble, to at least one lower node of the RS when the preamble of the RS is changed so that the lower node can sustain its connection to the RS without handover.

2. The method of claim 1, wherein the preamble change command message comprises at least one of index information of a new preamble of the RS and action time information regarding when to apply the new preamble.

3. The method of claim 1, wherein the preamble change notification message further comprises action time information regarding when to apply the new preamble, station identifier and flow identifier.

4. The method of claim 1, wherein the RS comprises a mobile RS, and the BS comprises one of a serving BS of the RS and a target BS.

5. The method of claim 1, wherein the determining of whether the preamble of the RS needs to change comprises:
   determining whether the preamble of the RS collides with a preamble of another node; and
   determining to change the preamble of the RS when the preambles collide.

6. A method of a Mobile Station (MS) in a wireless multihop relay communication system, the method comprising:
   communicating with a Base Station (BS) through a Relay Station (RS);
   in the process of the communication through the RS, determining at the MS whether a preamble change notification message is received from an upper node;
   obtaining new preamble information of the RS from the received message, when receiving the preamble change notification message comprising an index of new preamble; and
   receiving a new preamble signal of the RS according to the obtained information so that a connection to the RS is sustained without handover.

7. The method of claim 6, wherein the preamble change notification message further comprises action time information regarding when to apply the new preamble, station identifier and flow identifier.

8. The method of claim 6, wherein the receiving of the preamble signal comprises:
   determining whether an action time occurs; and
   receiving the new preamble signal from the RS when the action time occurs.

9. A method of a Relay Station (RS) in a wireless multihop relay communication system, the method comprising:
   providing a relay service;
   determining whether a preamble change command message is received from a Base Station (BS) during the relay service;
   obtaining new preamble information from the received message when receiving the preamble change command message;
   generating a preamble change notification message comprising an index of new preamble;
   sending the preamble change notification message to at least one lower node of the RS;
   changing a preamble signal according to the new preamble information; and
   transmitting the changed preamble signal so that the lower node can sustain its connection to the RS without handover.

10. The method of claim 9, wherein the preamble change command message comprises at least one of index information of the new preamble of the RS and action time information regarding when to apply the new preamble.

11. The method of claim 9, wherein the preamble change notification message further comprises action time information regarding when to apply the new preamble, station identifier and flow identifier.

12. An apparatus of a Base Station (BS) in a wireless multihop relay communication system, the apparatus comprising:
   a controller for determining whether a preamble of a Relay Station (RS) needs to change;
   a generator for, when it is necessary to change the preamble of the RS, generating a preamble change command message and a preamble change notification message; and
   a transmitter for sending the preamble change command to the RS by processing the preamble change command message in a physical layer and for sending the preamble change notification message, informing of the preamble change and comprising an index of new preamble, from the BS to a lower node of the RS by processing the preamble change notification message in the physical layer, so that the lower node can sustain its connection to the RS without handover.

13. The apparatus of claim 12, wherein the preamble change command message comprises at least one of index information of a new preamble of the RS and action time information regarding when to apply the new preamble.

14. The apparatus of claim 12, wherein the preamble change notification message further comprises action time information regarding when to apply the new preamble, station identifier and flow identifier.

15. The apparatus of claim 12, wherein the RS comprises a mobile RS, and the BS comprises one of a serving BS of the RS and a target BS.

16. The apparatus of claim 12, wherein the controller determines whether the preamble of the RS collides with a preamble of another node currently serviced, and, when the preambles collide, determines to change the preamble of the RS.

17. An apparatus of a Mobile Station (MS) in a wireless multihop relay communication system, the apparatus comprising:
   an analyzer of the MS for, when receiving a preamble change notification message, comprising an index of new preamble, from an upper node while communicating through a Relay Station (RS), obtaining new preamble information of the RS from the received message;
   a controller for changing a preamble of the RS according to the new preamble information; and
   a preamble demodulator for receiving a new preamble signal from the RS under control of the controller so that a connection to the RS is sustained without handover.

18. The apparatus of claim 17, wherein the preamble change notification message further comprises action time information regarding when to apply the new preamble, station identifier and flow identifier.

19. The apparatus of claim 17, wherein the controller directs the preamble demodulator to change the preamble of the RS at a set action time.

20. An apparatus of a Relay Station (RS) in a wireless multihop relay communication system, the apparatus comprising:
   a message analyzer for, when receiving a preamble change command message from a Base Station (BS) while providing a relay service, obtaining new preamble information from the received message;
   a controller for changing a preamble signal according to the new preamble information;
   a transmitter for, when the preamble signal is changed, sending a preamble change notification message, comprising an index of new preamble, to at least one lower node of the RS so that the lower node can sustain its connection to the RS without handover; and
   a preamble signal generator for generating the changed preamble signal.

21. The apparatus of claim 20, wherein the preamble change command message comprises at least one of index information of the new preamble of the RS and action time information regarding when to apply the new preamble.

22. The apparatus of claim 20, wherein the preamble change notification message further comprises action time information regarding when to apply the new preamble, station identifier and flow identifier.

* * * * *